Dec. 22, 1953  H. F. RUNDELL  2,663,781
PRESSURE PICKUP ELEMENT
Filed Aug. 11, 1949  2 Sheets-Sheet 1
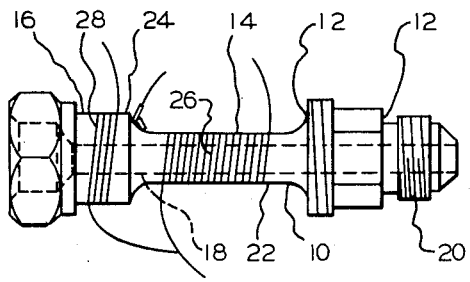
FIG. I.
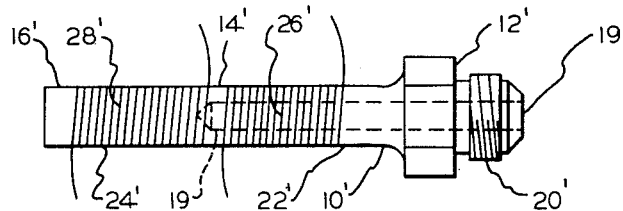
FIG. II.
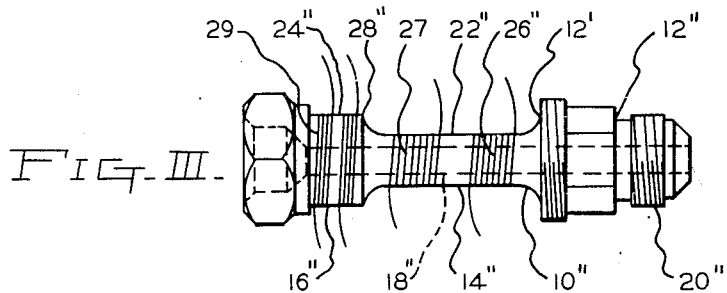
FIG. III.
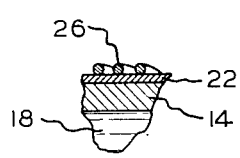
FIG. VI.
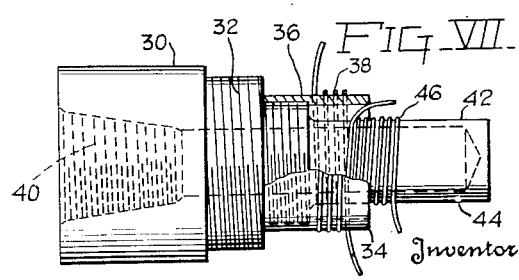
FIG. VII.
HARWOOD F. RUNDELL
By Beaman & Patch
ATTORNEYS Dec. 22, 1953     H. F. RUNDELL     2,663,781
PRESSURE PICKUP ELEMENT
Filed Aug. 11, 1949     2 Sheets-Sheet 2
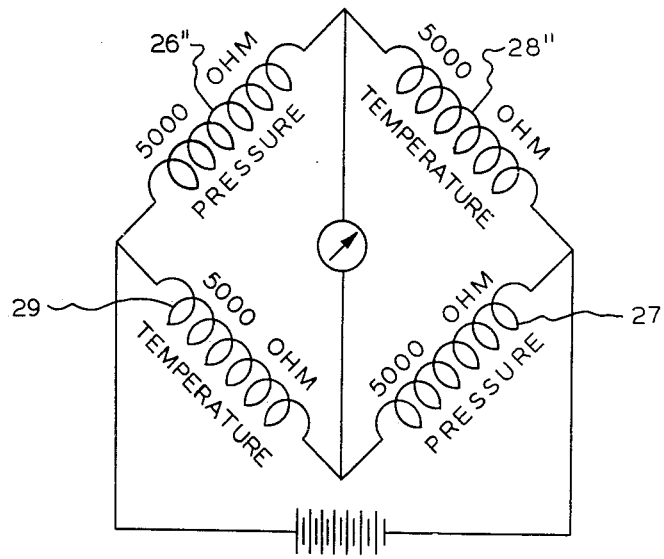
FIG. IV.
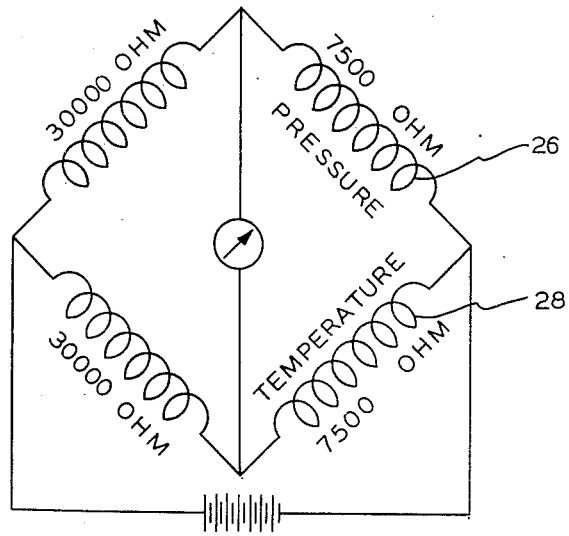
FIG. V.
Inventor
HARWOOD F. RUNDELL
By Beaman & Patch
ATTORNEYS Patented Dec. 22, 1953

2,663,781

UNITED STATES PATENT OFFICE 2,663,781

PRESSURE PICKUP ELEMENT

Harwood F. Rundell, Jackson, Mich., assignor to Aeroquip Corporation, Jackson, Mich., a corporation of Michigan Application August 11, 1949, Serial No. 109,703

3 Claims. (Cl. 201—63)

This invention relates to electric pressure gauges and more particularly to an electric pressure gauge employing electric strain-responsive wire elements. This application is a continuation-in-part of application Serial No. 743,215, filed April 22, 1947, now Patent No. 2,544,567.

It is an object of the invention to provide an electric pressure gauge which has the ability to make direct and permanent static calibration, to the elimination of hysteresis and the necessity of employing a bonding medium to secure the electric wire resistance elements in position.

It is also an object of the invention to provide an electric pressure gauge which provides an exceedingly accurate measurement and indication of both pressure and temperature changes, yet precisely compensates the temperature changes by the employment of an independent wire strain resistance element which is non-responsive to fluid pressure fluctuations and provides an accurate temperature balance.

Thus, the invention in one practical form thereof comprises an electrical resistance pressure responsive gauge comprising a hollow body part adapted for the introduction of pressure fluid into its interior and including a wall portion sensitive to variations in the fluid pressure, said wall portion having a hard and electrically insulated surface with a high electric resistance filament tension wound about said surface in position to respond to the fluid pressure fluctuations, said filament being adapted for connection with an indicating instrument and the tension winding of the filament being relied upon to maintain the desired intimate contact with the said body part surface, which latter is sufficiently hard as to permit the use of considerable tension to wind the filament into position while affording complete electrical insulation. The body parts may be formed from aluminum alloy which is susceptible to an anodic treatment to produce a surface film of appreciable hardness and having the required electrical insulating properties. It is to be understood, however, that the invention is not limited to the employment of aluminum alloy to form the body part, or to the employment of an anodized surface to constitute that upon which the pressure responsive filament is wound, since the body part may be formed of other materials and the required hardness and electrical insulating properties be otherwise secured as will be known to those skilled in the art.

The winding of the pressure responsive filament under tension onto a hard insulating surface eliminates the necessity for bonding the filament throughout its effective length to the surface on which it is wound, and makes it possible to fasten the ends where the lead wire connections are made, leaving the rest of the filament free to react to changes in diameter of the cylindrical body part on which it is wound.

The fact that the surface onto which the filament is wound is an electrical insulator makes it possible to eliminate the placing of a layer of insulating material between the filament and the cylinder. Besides being costly and time consuming in its application during the manufacturing process, this ordinary insulating material is relatively soft, and tends to yield under any increased tension in the filament resulting from the expansion of the cylinder wall under the influence of increasing pressures. This yielding introduces a lag in response, as well as a co-efficient of hysteresis, both of which are inimical to the analysis of high speed pressure phenomena.

The objects and advantages of my invention as well as those not stated above will appear from the following specification, when considered in connection with the appended claims and the accompanying drawings, in which Fig. I is a view in elevation of one form of the invention, Fig. II is a view in elevation of another form of the invention, Fig. III is a view of a modification of the invention, incorporating a double pressure coil and a double temperature compensation coil, Fig. IV is a diagram of a Wheatstone bridge circuit, used with the form of the invention shown in Fig. III, Fig. V is a diagram of a Wheatstone bridge circuit, using auxiliary high resistance, compensating and stabilizing coils, Fig. VI is a sectional view on an enlarged scale showing the close association of the pressure filament with the surface onto which it is tension wound, and Fig. VII is a view partially in section and partially in elevation of yet another form of the invention adapted for exact temperature compensation.

In the drawings the base cylinder 10 is constructed with a number of annular shoulders 12, a relatively thin bodied cylindrical center section 14, to hold the pressure filament 26, and a relatively thick bodied cylindrical section 16 to hold the temperature filament 28. As shown in Fig. I the tubular portion 18 extends completely through the base cylinder 10, and is fitted with threads 20, used to connect the base cylinder 10 with the pressure line to be tested. The outside surfaces 22 and 24 of the cylindrical portions 14 and 16 may be anodized to thereby give a very hard insulating coating or surface, which provides electrical insulation as well as a hard base to carry the pressure filament 26 and the temperature filament 28. The filaments 26 and 28 are preferably made of a wire of high specific resistance and may be of very small diameter (.001), so that coils of a high value of total resistance, such as in the order of 6,000 to 10,000 ohms, may be obtained from a single layer winding of extremely short axial length. I also wind the filaments 26 and 28 under tension onto the cylindrical portions 14 and 16, to insure a continuous contact with the surfaces 22 and 24 and the ability to measure negative pressures, with the elimination of hysteresis. The tension under which the filaments 26 and 28 are wound onto the cylindrical portions 14 and 16 is sufficiently great to insure the operation of the gauge in that portion of the stress strain curve which is linear, thereby giving greater accuracy.

The wall thickness of the cylindrical portion 14 is determined by the pressure under which the gauge is required to operate, and is made as thin as possible. The wall thickness of the cylindrical portions 16, however, is relatively great, in order that the filament 28 will affect the reading on the oscilloscope only as the result of changes in size of the base cylinder 10 due to temperature variations, and not from the changes in size due to the internal fluid pressure in the tubular portion 18.

It will be appreciated, therefore, that the invention comprises a hollow body part having an electrical conductor wire wound about a hollow wall portion, the interior of which is subjected to pressure which reacts with the wire to vary its resistance. This fluctuation in resistance of the wire coil wound upon the hollow wall portion provides a corresponding variation in the current flow through that resistance, thereby changing the voltage, which change can be measured in a Wheatstone bridge. The output of the Wheatstone bridge may be amplified and viewed on a cathode-ray type oscilloscope.

The modification shown in Fig. II comprises the base cylinder 10', shoulder portions 12', cylindrical portions 14' and 16', surfaces 22' and 24' (which are rendered hard and electrically insulated), and filament windings 26' and 28'. The difference in this construction, however, lies in the fact that the aperture 19 does not extend throughout the length of the base cylinder 10', but dead ends prior to reaching a point beneath the cylindrical surface 16'. The aperture 19 is fitted with threads 20' to attach the element to the line to be tested, in the same manner as shown in the analyzer illustrated in Fig. I. With the invention in the form shown in Fig. II it is possible to attach the gauge as a spur in the line to be tested. Also there is an extremely small possibility of any pressure fluctuation being recorded in the temperature filament 28', by reason of the fact that the temperature filament 28' does not encircle the aperture 19.

The modification shown in Fig. III comprises the base cylinder 10'', annular shoulders 12'', cylindrical sections 14'' and 16'', the tubular center hole 18'', the threads 20'', and the hard electrically insulated surfaces 22'' and 24''. The modification consists of winding two pressure filaments 26'' and 27 onto the cylindrical portion 14'', and two temperature filaments 28'' and 29 onto the cylindrical portion 16''. The gauge of Fig. III is used with the Wheatstone bridge circuit of Fig. IV with the four filaments 26'', 27, 28'' and 29 making up the bridge circuit. Manufacturing problems encountered in winding the filament coils 26'', 27, 28'' and 29 show that the Wheatstone bridge circuit of Fig. V is preferable for most work. This has cut the winding operation from four coils to two, and, with the proper external resistances, the two circuits are equivalent in output. The tension wound coils are particularly difficult to wind and dress, and by using only two coils on each pick-up element the manufacturing is simplified. The compensating coils are contained in the associated amplifier.

In Fig. VII I have illustrated a further modification of my invention, especially designed to compensate for rapid changes in temperature. There the base cylinder 30 is formed with an annular threaded shoulder 32, adapted to receive and support a projecting collar 34. The outer surface 36 of the collar 34 may be anodized, and the temperature compensating coil 38 is wound thereon in the same manner as temperature coils 28 are wound above. The pressure receiving aperture 40 is dead-ended so that fluid will flow past the pressure pick-up element, and pressure changes will be transmitted into aperture 40. The cylindrical portion 42, with the hard surface 44 is the same as portion 14 in Fig. I, and provides the cylindrical area for winding the pressure filament 46. The advantage of this modification over those shown in Fig. I and Fig. II is that here the coils are placed in positions relative to each other, and relative to the masses of metal so that equal rates of flow of heat will be obtained, regardless of the source of heat. This will prevent unbalanced heat conditions which might be encountered in the use of the construction of Figs. I and II when rapid changes of temperature are taking place. This construction may likewise be adapted to receive the double filament hook-up shown in Fig. III. It is to be understood that the fluid in the aperture 40 will be relatively stagnant, and that heat transfer will take place principally from the flow of fluid past the end of the pressure element and not from fluid within the aperture 40.

The surfaces 22 and 24 provide an extremely hard base which will carry the filament and expand it accurately and evenly, while at the same time providing electrical insulation, and making the construction much cheaper than if the filament were to be secured to the cylindrical wall by means of some bonding material. Also with this construction I find that hysteresis is minimized, due to the fact that there are no large moving parts which will tend to introduce inertia factors into the readings. By incorporating the temperature filament 28 on a part of the gauge not subject to pressure, and yet subject to all temperature variations, I have been able to remove a troublesome variable from the analysis of high fluid pressure phenomena.

Having thus described my invention what I claim and desire to protect by Letters Patent is:

1. In an electrical resistance type pressure responsive device, a hollow body part adapted for the introduction of fluid pressure into its interior, said body part including a wall portion sensitive to variations in the fluid pressure and a contiguous concentric wall portion non-responsive to the pressure changes, a high electric resistance filament disposed upon said pressure sensitive wall portion and adapted to respond to fluctuations in the fluid pressure, and another high electric resistance filament disposed upon said concentric wall portion and adapted to be responsive to changes in temperature on the latter, the construction and arrangement being such that the said filaments are balanced as to temperature changes independently of the pressure changes.

2. An electric pressure head comprising an elongated member having an inner wall portion defining an enclosed chamber adapted for connection to a source of pressure, said member also having an outer wall portion encompassing said inner wall portion and said chamber, said inner and outer wall portions being subjected to substantially identical temperature changes, said outer wall portion being closed from said chamber so as to be unaffected by pressure within said chamber, a strain responsive wire element mounted upon the exterior surface of said inner wall portion in the proximity of said chamber so as to be sensitive to stress or strain in said chamber, and a separate wire element mounted upon the exterior surface of said outer wall portion, said separate wire element being responsive only to temperature changes, said wire elements being located in positions relative to each other and to the masses of their respective wall portions that the wire elements are subjected to equal rates of flow of heat.

3. An electric pressure head comprising an elongated member having an inner wall portion defining an enclosed chamber adapted for connection to a source of pressure, said member also having an outer wall portion encompassing said inner wall portion and said chamber, said inner and outer wall portions being subjected to substantially identical temperature changes and said wall portions being of hard electrically insulated material, said outer wall portion being closed from said chamber so as to be unaffected by pressure within said chamber, a strain responsive wire element tension wound directly upon the exterior surface of said inner wall portion in the proximity of said chamber so as to be sensitive to stress or strain in said chamber, and a separate wire element tension wound directly upon the exterior surface of said outer wall portion, said separate wire element being responsive only to temperature changes, said wire elements being located in positions relative to each other and to the masses of their respective wall portions that the wire elements are subjected to equal rates of flow of heat.

HARWOOD F. RUNDELL.

References Cited in the file of this patent

UNITED STATES PATENTS

| Number | Name | Date |
|---|---|---|
| 2,474,146 | Hathaway | June 21, 1949 |
| 2,477,026 | Wenk | July 26, 1949 |
| 2,544,567 | Rundell | Mar. 6, 1951 |